US009191875B1

(12) United States Patent
Kazeminejad et al.

(10) Patent No.: US 9,191,875 B1
(45) Date of Patent: Nov. 17, 2015

(54) USE OF CONCURRENT PILOT SIGNALS AT DIFFERENT TRANSMISSION POWER LEVELS

(71) Applicant: Sprint Spectrum L.P., Overland Park, KS (US)

(72) Inventors: Saied Kazeminejad, Ashburn, VA (US); Jasinder P. Singh, Olathe, KS (US); Brett Christian, Independence, MO (US); Senthil K. Veeragavan, Ashburn, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 158 days.

(21) Appl. No.: 13/967,020

(22) Filed: Aug. 14, 2013

(51) Int. Cl.
| *H04J 1/16* | (2006.01) |
| *H04W 36/30* | (2009.01) |
| *H04W 52/24* | (2009.01) |
| *H04L 25/02* | (2006.01) |
| *H04B 7/04* | (2006.01) |
| *H04B 17/24* | (2015.01) |

(52) U.S. Cl.
CPC .............. *H04W 36/30* (2013.01); *H04W 52/24* (2013.01); *H04B 7/0491* (2013.01); *H04B 17/24* (2015.01); *H04L 25/0226* (2013.01)

(58) Field of Classification Search
CPC ................... H04W 36/0016; H04W 36/0022; H04W 36/20; H04W 36/30; H04W 52/40; H04W 52/146; H04L 5/005; H04B 7/0491; H04B 17/24
See application file for complete search history.

(56) References Cited

U.S. PATENT DOCUMENTS

| 7,177,658 | B2* | 2/2007 | Willenegger et al. | 455/522 |
| 7,218,948 | B2* | 5/2007 | Laroia et al. | 455/522 |
| 7,418,046 | B2* | 8/2008 | Gore et al. | 375/260 |
| 7,787,899 | B1 | 8/2010 | Talley et al. | |
| 8,311,134 | B2* | 11/2012 | Zhang et al. | 375/260 |
| 8,427,976 | B1* | 4/2013 | Dinan | 370/252 |
| 9,042,219 | B2* | 5/2015 | Seo et al. | 370/229 |
| 9,055,604 | B2* | 6/2015 | Zhang et al. | 370/216 |
| 2004/0166886 | A1* | 8/2004 | Laroia et al. | 455/522 |
| 2004/0166887 | A1* | 8/2004 | Laroia et al. | 455/522 |
| 2007/0213087 | A1* | 9/2007 | Laroia et al. | 455/522 |
| 2008/0049791 | A1* | 2/2008 | Tirkkonen et al. | 370/491 |
| 2010/0315967 | A1 | 12/2010 | Patel et al. | |
| 2011/0189995 | A1* | 8/2011 | Tinnakornsrisuphap et al. | 455/436 |

OTHER PUBLICATIONS

"LTE University—Transmission Mode 101" printed from the World Wide Web on Aug. 7, 2013.

* cited by examiner

*Primary Examiner* — Brian O'Connor

(57) ABSTRACT

A method and apparatus to use multiple pilot signals of different transmission power levels in a wireless communication system. A base station may broadcast in its coverage area at least two different pilot signals concurrently with each other but at different transmission power levels than each other. One of these pilot signals, transmitted at a normal pilot transmission power level for instance, may be for receipt and evaluation by certain UEs served by the base station, such as UEs that are not set to receive beamformed transmission of bearer traffic from the base station. Whereas another one of these pilot signals, transmitted at an increased pilot transmission power level for instance, may be for receipt and evaluation by other UEs served by the base station, such as UEs that are set to receive beamformed transmission of bearer traffic from the base station.

17 Claims, 5 Drawing Sheets

USE OF CONCURRENT PILOT SIGNALS AT DIFFERENT TRANSMISSION POWER LEVELS

BACKGROUND

Unless otherwise indicated herein, the information described in this section is not prior art to the claims is not admitted to be prior art by inclusion in this section.

In a cellular wireless communication system, as a user equipment device (UE) operates within coverage of a cellular base station, it can be important for the UE to report air interface performance metrics to the base station from time to time. By way of example, the UE may monitor signal strength (e.g., receive strength, receive signal to noise ratio, or the like) of a pilot signal being transmitted by its serving base station and signal strength of pilot signals being transmitted by adjacent base stations and may report those metrics to its serving base station to facilitate handover decisions and other adjustments in air interface communication. For instance, if the UE's measurement report indicates that pilot strength from its serving base station is sufficiently lower than pilot strength from an adjacent base station, the serving base station may direct the UE to hand over to the adjacent base station. Further, if the UE's report indicates that pilot strength from its serving base station is threshold low, the serving base station may direct the UE to scan for and report coverage from one or more other base stations and/or on one or more other carrier frequencies, to facilitate evaluation for possible handover.

OVERVIEW

As a base station serves UEs in its coverage area, the base station may determine that particular UEs have especially poor coverage, as indicated by threshold low reported pilot strength and/or by other metrics, and the base station may responsively take action to help improve communication of bearer traffic to those particular UEs. For instance, the base station may receive from UEs that are operating at or near the edge of the base station's coverage area reports of threshold low pilot strength from the base station, and the base station may responsively work to improve bearer communication to those UEs.

One way to improve bearer communication to a UE is to beamform transmissions of bearer traffic to the UE. To do this, the base station could receive a sounding reference signal from the UE and make use of the phase and/or other characteristics of that received signal (e.g., phase differences between various antennas or antenna elements) in order to configure transmission of a beam to the UE, and the base station could then transmit bearer traffic to the UE on that beam. Focusing transmission of bearer traffic to a particular UE can help increase the power at which the UE receives such traffic and can thereby help improve throughput to the UE.

Unfortunately, however, even though the base station may beamform or otherwise target bearer communication to a particular UE so as to help improve throughput to the UE, the UE may still be receiving and reporting threshold low pilot signal strength from the base station. This is because the base station's pilot signal is by definition broadcast generally throughout the base station's coverage area and is not beamformed or otherwise targeted to just a particular UE, so a UE in poor coverage will likely receive low pilot signal strength, even if the UE is receiving bearer communications at higher power. In response to the UE's report of threshold low pilot strength, the base station may thus initiate a process of handing the UE over to another coverage area. Yet such handover may be unnecessary and undesirable if the UE is receiving bearer traffic from the base station with improved throughput as a result of beamforming or other action taken by the base station.

Disclosed herein is a method and apparatus to help overcome this problem. In accordance with the disclosure, a base station will broadcast in its coverage area at least two different pilot signals concurrently with each other (e.g., interleaved over time with each other, or on parallel channels) but at different transmission power levels than each other. One of these pilot signals, transmitted at a normal pilot transmission power level for instance, would be for receipt and evaluation by certain UEs served by the base station, such as those that are not set to receive beamformed bearer communication from the base station. Whereas another one of these pilot signals, transmitted at an increased pilot transmission power level for instance, would be for receipt and evaluation by other UEs served by the base station, such as those that are set to receive beamformed bearer communication from the base station.

Thus, certain UEs served by the base station, such as those that are not set to receive beamformed bearer communication from the base station, will be configured to receive and evaluate one of the pilot signals, such as the one transmitted at normal pilot transmission power level for instance, and to report pilot signal strength based on evaluation of that pilot signal. Whereas other UEs served by the base station, such as those that are set to receive beamformed bearer communication from the base station, will be configured to receive and evaluate the other pilot signal transmitted at a higher power level, and to report pilot signal strength based on evaluation of that other pilot signal.

Advantageously, this arrangement can thereby help to reduce the likelihood that UEs that are experiencing improved throughput as a result of beamforming or other action taken by the base station will report threshold low pilot signal strength and will thus be directed to hand over to another coverage area.

Accordingly, in one respect, disclosed is a method operable by a base station. The method involves the base station serving a plurality of UEs over an air interface. Further, the method involves, while the base station is serving the plurality of UEs, the base station wirelessly broadcasting at least two distinct pilot signals concurrently with each other but at different transmission power levels than each other. In particular, this broadcast of pilot signals would include (i) a first pilot signal broadcast at a first transmission power level, for receipt and evaluation by a first proper subset of the UEs served by the base station but not for receipt and evaluation by a second proper subset of the UEs served by the base station, and (ii) a second pilot signal broadcast at a second transmission power level higher than the first transmission power level, for receipt and evaluation by the second proper subset of the UEs served by the base station but not for receipt and evaluation by the first proper subset of UEs served by the base station.

The method then involves the base station receiving from each UE of the first proper subset a respective first measurement report that indicates signal strength of the first pilot signal but that does not indicate signal strength of the second pilot signal, and the base station receiving from each UE of the second proper subset a respective second measurement report that indicates signal strength of the second pilot signal but that does not indicate signal strength of the first pilot signal.

Further, in another respect, disclosed is a method operable by a UE served by a base station. The method involves the UE receiving at least two pilot signals wirelessly broadcast from the base station concurrently with each other but at different transmission power levels than each other (such by the fact that both such pilot signals are broadcast in the base station's coverage area and thus arrive at the UE), but selecting just one of the received pilot signals to evaluate and use as a basis to report pilot signal strength to the base station. The method then involves the UE evaluating the selected received pilot signal, to determine pilot signal strength, and the UE reporting the determined pilot signal strength to the base station.

Still further, in another respect, disclosed is a base station operable to serve a plurality of UEs. Such a base station includes an antenna structure that is arranged to exchange communications with the UEs over an air interface and that therefore engages in downlink control and bearer communication and uplink control and bearer communication.

On the downlink, while the base station is serving the plurality of UEs, the antenna structure broadcasts on the air interface at least two distinct pilot signals concurrently with each other but at different transmission power levels than each other, including (i) a first pilot signal at a first transmission power level, for receipt and evaluation by a first proper subset of the UEs but not for receipt and evaluation by a second proper subset of the UEs, and (ii) a second pilot signal at a second transmission power level higher than the first transmission power level, for receipt and evaluation by the second proper subset of the UEs but not for receipt and evaluation by the first proper subset of the UEs.

And on the uplink, the antenna structure receives, from each UE of the first proper subset a respective first measurement report indicating signal strength of the first pilot signal broadcast by the antenna structure but not indicating signal strength of the second pilot signal broadcast by the antenna structure, and the antenna structure receives, from each UE of the second proper subset a respective second measurement report indicating signal strength of the second pilot signal broadcast by the antenna structure but not indicating signal strength of the first pilot signal broadcast by the antenna structure.

These as well as other aspects, advantages, and alternatives will become apparent to those of ordinary skill in the art by reading the following detailed description, with reference where appropriate to the accompanying drawings. Further, it should be understood that the description provided in this overview and elsewhere in this document is provided by way of example only.

DETAILED DESCRIPTION

Figure 1:
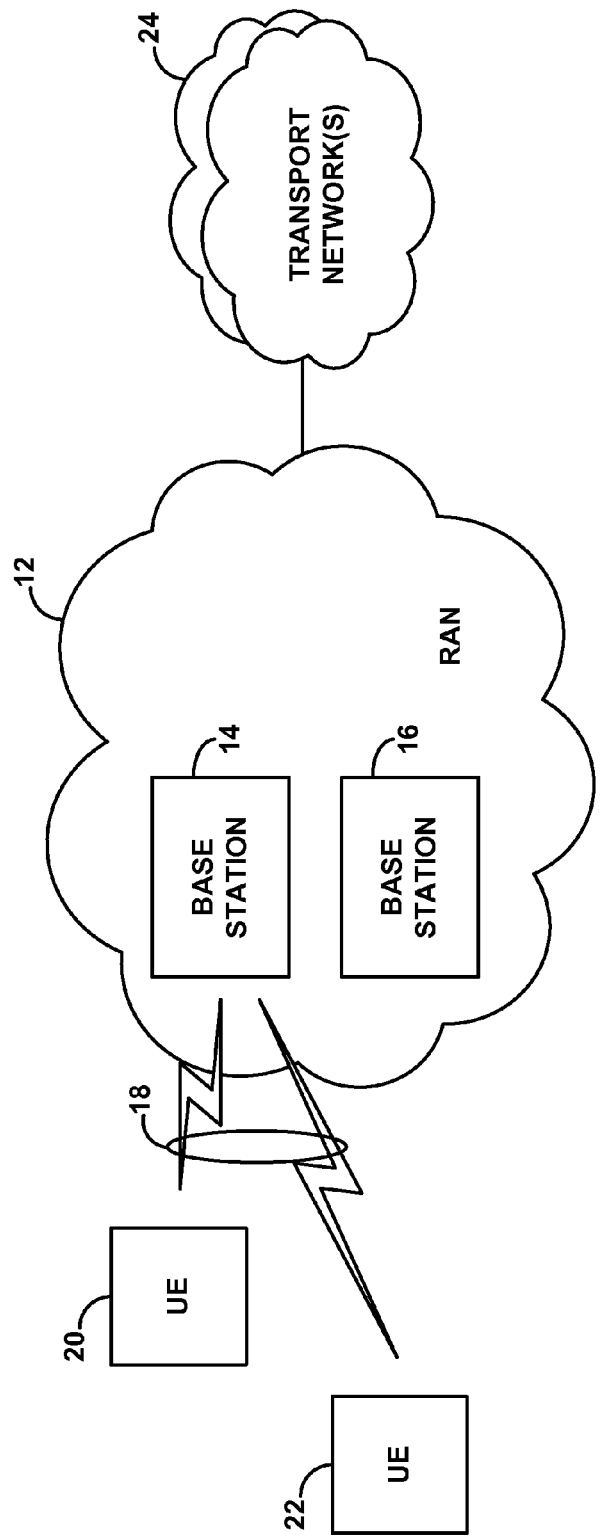
FIG. 1 is a simplified block diagram of a wireless communication system in which the present method can be implemented.

Referring to the drawings, as noted above, FIG. 1 is a simplified block diagram of a wireless communication system in which the present method can be implemented. It should be understood, however, that this and other arrangements described herein are set forth only as examples. As such, those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

FIG. 1 depicts the example communication system as including at its core a radio access network (RAN) 12 having various base stations that are each configured to serve UEs over a respective radio frequency (RF) air interface. For simplicity, the RAN is shown including two representative base stations 14, 16, and base station 14 is shown serving two representative UEs over an air interface 18, including a first UE 20 operating relatively close to the base station 14 and a second UE 22 operating more distant from the base station 14, such as at an edge of the base station's coverage area.

RAN 12 then provides connectivity with one or more transport networks 24, such as the public switched telephone network (PSTN) and/or the Internet for instance. With this arrangement, UEs that are positioned within coverage of a given base station and that are suitably equipped may work with the base station to acquire a radio link layer connection with the base station and may then engage in air interface communication with the base station and in turn with various remote entities on the transport network(s) and/or with other UEs served by the RAN.

RAN 12 and its served UEs may be configured to operate in accordance with a particular air interface protocol or "radio access technology," with communications from the base stations to UEs defining a downlink or forward link and communications from the UEs to the base stations defining an uplink or reverse link. Examples of existing air interface protocols include, without limitation, Orthogonal Frequency Division Multiple Access (OFDMA (e.g., Long Term Evolution (LTE) or Wireless Interoperability for Microwave Access (WiMAX)), Code Division Multiple Access (CDMA) (e.g., 1xRTT and 1xEV-DO), and Global System for Mobile Communications (GSM), among others.

In accordance with the air interface protocol, the air interface 18 may operate on particular frequency spectrum in the form of one or more ranges of RF spectrum defining a frequency bandwidth. Depending on the air interface protocol, the air interface may use different spectrum for its uplink and downlink or may use the same spectrum allocated over time or in another manner between its uplink and downlink. Further, various coverage areas of the RAN could use the same frequency spectrum as each other, with communications in adjacent coverage areas being modulated or otherwise encoded to distinguish one coverage area from another.

Also in accordance with the air interface protocol, the air interface may define various channels for communication between the UEs and the base station. For instance, on the downlink, the air interface may define one or more control channels on which the base station may broadcast a pilot signal that UEs may monitor to evaluate coverage strength and on which the base station may transmit page messages and operational parameters to UEs, and one or more traffic channels on which the base station may transmit bearer traffic (such as voice data and other user data) to UEs. And on the uplink, the air interface may define one or more control channels on which UEs may transmit access requests, measurement reports, and other control messages to the base station, and one or more traffic channels on which UEs may transmit bearer traffic to the base station. These various channels may be defined in various ways, such as with time division multiplexing, code division multiplexing, and/or frequency division multiplexing.

By way of example and without limitation, the air interface at issue may be an LTE air interface, and the base stations and UEs may thus be configured to operate in accordance with LTE. Under LTE, the air interface on both the downlink and the uplink may span a particular bandwidth (such as 1.4 MHz, 3 MHz, 5 MHz, 10 MHz, or 20 MHz) that is divided primarily into subcarriers that are spaced apart from each other by 15 kHz. Further, the air interface may be divided over time into a continuum of 10 millisecond frames, with each frame being further divided into ten 1 millisecond subframes that are in turn divided into two 0.5 millisecond segments. In each 0.5 millisecond segment, the air interface may then be considered to define a number of 12-subcarrier wide "resource blocks" spanning the frequency bandwidth (i.e., as many as would fit in the given frequency bandwidth). In addition, each resource block may be divided over time into symbol segments of 67 μs each, with each symbol segment spanning the 12-subcarriers of the resource block and thus supporting transmission of 12 OFDM symbols in respective "resource elements." Thus, the base station and a served UE may transmit symbols to each other in these resource elements, particularly on subcarriers that are spaced apart from each other by 15 kHz and in time segments spanning 67 μs each.

The LTE air interface may then define various channels made up of certain ones of these resource blocks and resource elements. For instance, on the downlink, certain resource elements in each resource block may be reserved to define a physical downlink shared channel (PDSCH) for carrying bearer data from the base station to UEs, and other resource elements may be reserved to define a physical downlink control channel (PDCCH) for carrying control signals such as page messages and resource allocations from the base station to UEs. Further, certain resource elements per downlink resource block may be reserved to define a pilot signal, known as a "reference signal" in LTE parlance, that UEs can monitor as a basis to evaluate strength of coverage.

Similarly, on the uplink, certain resource elements in each resource block may be reserved to define a physical uplink shared channel (PUSCH) for carrying bearer data from UEs to the base station, and other resource elements may be reserved to define a physical uplink control channel (PUCCH) for carrying control signals such as resource requests from UEs to the base station. Further, certain resource blocks may be reserved to define a physical random access channel (PRACH) for carrying access probes from UEs to the base station.

In line with the discussion above, a UE operating in accordance with the LTE protocol will be configured to regularly receive and evaluate the reference signal broadcast by its serving base station and perhaps reference signals broadcast by other base stations, in order to evaluate coverage and facilitate possible handover. In particular, the UE may be configured to evaluate the strength of incoming communication on the PDCCH resource elements that define the base station's reference signal and thereby determine a reference signal receive power (RSRP). In practice, the UE may also determine a reference signal receive quality (RSRP) such as signal-to-noise ratio of the reference signal, but for simplicity here any such measurements may be considered to fall under the general umbrella of reference signal strength or pilot signal strength or the like.

From time to time, the UE may then transmit to its serving base station an RF measurement report that specifies the RSRP that the UE determined for the serving base station's reference signal and perhaps the RSRP that the UE determined for each of various neighboring base stations' reference signal. And the UE's serving base station may use this information as a basis to make handover decisions. As discussed above, for instance, if the UE reports threshold poor signal strength from its serving base station, that base station may direct the UE to hand over to another base station and/or to scan for and report other RF performance data such as reference signal strength detected on other carrier frequencies for instance.

Under LTE, a UE may also be configured to operate with a particular "transmission mode" that defines certain aspects of downlink communication between the base station and the UE. (The term "transmission mode" in this regard relates to downlink transmission to the UE.) For example, the transmission mode may define a particular coding scheme that the base station will use for PDSCH communication to the UE, and thus that the UE will use to demodulate incoming PDSCH communication. As another example, the transmission mode may define a particular antenna scheme or set of possible antenna schemes that the base station will be using for PDSCH communication to the UE, such as whether the base station will use a particular arrangement of a single-antenna mode, a transmit diversity mode, a multi-input multi-output (MIMO) mode, and/or a beamforming mode for instance.

The transmission mode and antenna scheme for a UE may be set based on various factors such as UE capabilities and pilot strength reported by the UE. For instance, if the UE reports threshold high signal strength from its serving base station, the base station may opt to have the UE operate with a transmission mode that does not involve use of beamforming to transmit bearer data to the UE, i.e., in a non-beamforming transmission mode. Whereas, if the UE reports threshold low signal strength from its serving base station, the base station may opt to have the UE operate with a transmission mode that involves beamforming to transmit bearer data to the UE, i.e., in a beamforming transmission mode. The base station may transmit to the UE a control signal (e.g., a radio resource configuration (RRC) control signal on the PDCCH) that specifies the transmission mode that will be used, and the UE may receive that control signal and keep a record of the transmission mode. Thus, in operation, the UE may have a record of whether or not the base station will be using beamforming for downlink transmission of bearer data to the UE. Alternatively, the UE and/or base station could determine in some other way what the transmission mode of the UE will be, such as whether or not the base station will be beamforming PDSCH communication to the UE.

In the arrangement of FIG. 1, for instance, UE 20 that is operating relatively close to its serving base station 14 may report a relatively high RSRP to the base station, so the base station may inform UE 20 that the transmission mode for PDSCH transmission to the UE will be a non-beamforming transmission mode. Whereas, UE 22 that is operating relatively far from its serving base station 14 may report a relatively low RSRP to the base station, so the base station may inform UE 22 that the transmission mode for PDSCH transmission to the UE will be a beamforming transmission mode. Alternatively, each UE may determine on its own that the base station will or will not be using beamforming for PDSCH transmission to the UE, based on various factors such as the RSRP that the UE has reported to the base station.

In accordance with the present disclosure, as discussed above, a base station will broadcast two or more pilot signals concurrently with each other but at different transmission power levels than each other, with a first one of those pilot signals having a first transmission power level and being for receipt and evaluation by one or more particular UEs served by the base station, and a second one of those pilot signals having a second transmission power level higher than the first transmission power level and being for receipt and evaluation by one or more other UEs served by the base station. Optimally, for instance, the first pilot signal may be for receipt and evaluation by UEs that are operating with a non-beamforming transmission mode, whereas the second pilot signal broadcast with higher transmission power may be for receipt and evaluation by UEs that are operating with a beamforming transmission mode. Based on their mode of operation, individual UEs will then decide which pilot signal to evaluate and will evaluate the chosen pilot signal and generate and send an associated measurement report.

One way to broadcast two or more pilot signals concurrently but at different transmission power levels is to multiplex the pilot signals with each other over time and use different transmission power for transmission of the different pilot signals. (Although multiplexing may technically mean that the signals are being transmitted alternatively over time and thus not really at the same time, the effect of such multiplexing over time will be considered to be an example of transmitting the signals "concurrently" with each other.) By way of example, under LTE, the base station can be configured to alternate between the reference signal transmission power level on a per subframe basis, such as by transmitting in its reference signal resource elements at a normal transmission power level in every odd numbered subframe and transmitting in its reference signal resource elements at an increased power level in every even numbered subframe. (The increase in transmission power could be to any desired extent, possibly depending on the number of antennas in use, such as 3 dB for a 2 antenna configuration or 6 dB for a 4 antenna configuration.) In this way, the base station can be considered to transmit two distinct reference signals concurrently with each other but at different transmission power levels than each other. Namely, the odd numbered subframes can be considered to carry a first reference signal at a first transmission power level, and the even numbered subframes can be considered to carry a distinct second reference signal at a second, increased transmission power level.

With this implementation, each UE served by the base station may be correspondingly configured to select just one of the reference signals based on a factor such as whether the UE is operating with a beamforming transmission mode or an non-beamforming transmission mode, and to evaluate that selected reference signal. Thus, in the arrangement of FIG. 1, if UE 20 is operating with a non-beamforming transmission mode, then UE 20 may responsively receive and evaluate just the reference signal in the odd numbered subframes, transmitted at a normal transmission power level. Whereas, if UE 22 is operating with a beamforming transmission mode, then UE 22 may responsively receive and evaluate just the reference signal in the even numbered subframes, transmitted at an increased transmission power level. In practice, each such UE may technically receive both reference signals, but in this example implementation each UE would evaluate just one of the received reference signals, by measuring receive strength on the reference signal resource elements in the just the appropriate subframes, possibly disregarding the reference signal resource elements in each other subframe. The UE may then generate and transmit to base station 14 a measurement report indicating determined RSRP of the reference signal that the UE evaluated.

Another way to broadcast two or more pilot signals concurrently but at different transmission power levels is to transmit each pilot signal on a different physical downlink control channel. For instance, under an air interface protocol such as CDMA that defines each downlink channel by respective coding (e.g., using a specific Walsh code respectively to encode each downlink channel), or under a variation of the LTE protocol or other protocol, the base station could define two or more pilot channels and could transmit a first pilot signal at a first transmission power level on one of those channels and a second pilot signal at a second, increased transmission power level on another one of those channels. In this implementation, each UE served by the base station would then be configured to select just one of those pilot channels to evaluate and to disregard the other. And the UE may similarly generate and transmit to its serving base station a measurement report indicating the pilot strength of the pilot signal that the UE evaluated.

Figure 2:
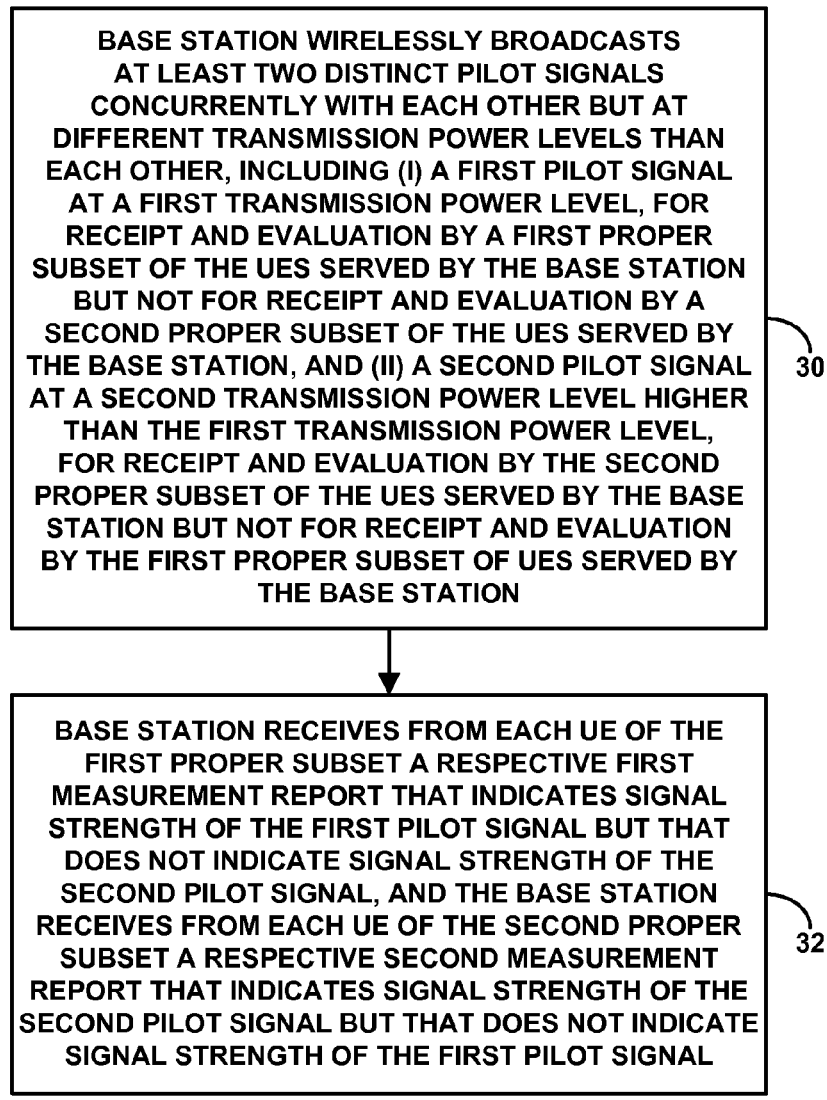
FIG. 2 is a flow chart depicting functions that can be carried out by a base station in accordance with the disclosure.

FIG. 2 is a flow chart depicting these functions from the perspective of a serving base station, such as base station 14 for instance, which is serving multiple UEs such as UE 20 and UE 22 for instance. As shown in FIG. 2, at block 30, the base station wirelessly broadcasts at least two distinct pilot signals concurrently with each other but at different transmission power levels than each other, including (i) a first pilot signal at a first transmission power level, for receipt and evaluation by a first proper subset of the UEs served by the base station but not for receipt and evaluation by a second proper subset of the UEs served by the base station, and (ii) a second pilot signal at a second transmission power level higher than the first transmission power level, for receipt and evaluation by the second proper subset of the UEs served by the base station but not for receipt and evaluation by the first proper subset of UEs served by the base station. In the arrangement of FIG. 1, the first proper subset may be UE 20, and the second proper subset may be UE 22.

At block 32, the base station receives from each UE of the first proper subset a respective first measurement report that indicates signal strength of the first pilot signal but that does not indicate signal strength of the second pilot signal, and the base station receives from each UE of the second proper subset a respective second measurement report that indicates signal strength of the second pilot signal but that does not indicate signal strength of the first pilot signal. For instance, UE 20 may receive and evaluate just the first pilot signal and generate and transmit to the base station an associated first measurement report, and so the base station may receive that first measurement report. Whereas, UE 22 may receive and evaluate just the second pilot signal and generate and transmit to the base station an associated second measurement report, and so the base station may receive that second measurement report.

In practice, the base station may then use the received measurement reports as a basis to control UE handover. For instance, for each UE in the first proper subset, the base station may use the first measurement report received from the UE as a basis to control handover of the UE, in the manner discussed above for example. Likewise, for each UE in the first proper subset, the base station may use the second measurement report received from the UE as a basis to control handover of the UE, also in the manner discussed above for example.

Figure 3:
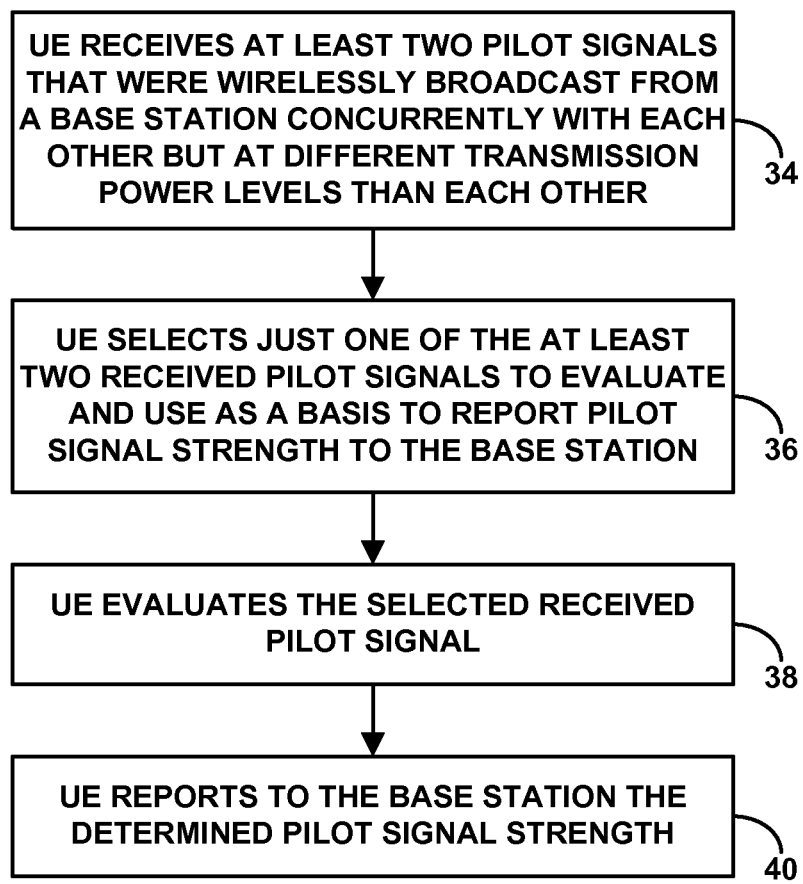
FIG. 3 is a flow chart depicting functions that can be carried out by a UE in accordance with the disclosure.

FIG. 3 is next a flow chart depicting these functions from the perspective of a UE, such as UE 20 or UE 22 for instance, served by base station 14. As shown in FIG. 3, at block 34, the UE receives at least two pilot signals that were wirelessly broadcast from the base station concurrently with each other but at different transmission power levels than each other. At block 36, the UE selects just one of the at least two received pilot signals to evaluate and use as a basis to report pilot signal strength to the base station. And at block 38, the UE thus evaluates the selected received pilot signal, to determine pilot signal strength. And at block 40, the UE reports to the base station the determined pilot signal strength.

In line with the discussion above, such a UE may be set to operate in a downlink transmission mode that is either beamforming or non-beamforming. In that case, the act of selecting just one of the at least two received pilot signals to evaluate and use as a basis to report determined pilot strength to the base station comprises performing the selecting based on whether the downlink transmission mode in which the UE is set to operate is beamforming or is rather non-beamforming. For instance, the UE may receive from the base station a directive for the UE to operate in the downlink transmission mode that is either beamforming or non-beamforming, and the UE may responsively (i) operate in the downlink transmission mode, such as by recording an indication that that is its mode, and (ii) performing the selecting based on that mode.

Figure 4:
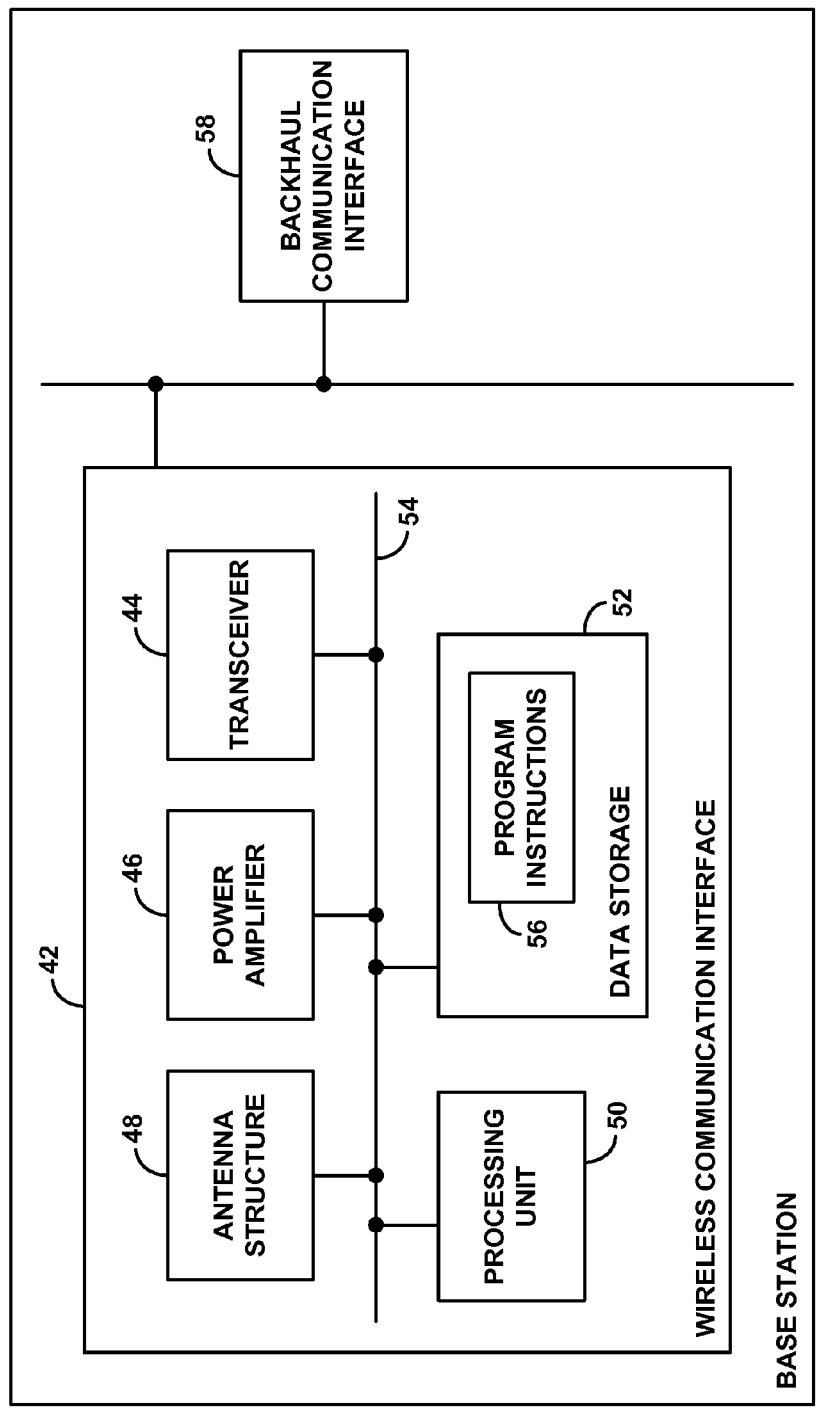
FIG. 4 is a block diagram of an example base station operable in accordance with the disclosure.

FIG. 4 is next a simplified block diagram of an example base station operable in accordance with the present disclosure. As shown in FIG. 4, the example base station includes a wireless communication interface 42, which is shown including a transceiver 44, a power amplifier 46, an antenna structure 48, a processing unit 50, and data storage 52, some or all of which may be coupled together by a system bus, network, or other connection mechanism 54 or may be integrated together in other ways. In some base station arrangements, the antenna structure may be provided at the top of a base station tower, to facilitate providing broad coverage. In other base station arrangements (such as femtocells or other small cells), the antenna structure and indeed the entire base station may have a much smaller form factor.

In the arrangement shown, antenna structure 46 is arranged to exchange communications with UEs served by the base station, by transmitting and receiving communications over an air interface. Further, power amplifier 46 may be programmatically controllable, by the processing unit 50 for instance, to control the transmission power at which the antenna structure engages in particular transmissions, such as transmissions on particular resource blocks and particular resource elements for example. Processing unit 50 may then comprise one or more general purpose processors (e.g., microprocessors) and/or one or more special purpose processors (e.g., application specific integrated circuits). And as shown, data storage 52 may hold program instructions 56, which may be executable by processing unit 50 to control or carry out various base station functions described herein, such as to cause the antenna structure to transmit two or more pilot signals concurrently but at different transmission power levels for instance.

As further shown, the base station includes a backhaul communication interface 58, which may enable the base station to communicate with other entities of the RAN, such as with other base stations and/or with supporting infrastructure such as a switch or gateway system providing connectivity with one or more transport networks.

In line with the discussion above, while the base station is serving UEs, the antenna structure 48 broadcasts on the air interface at least two distinct pilot signals concurrently with each other but at different transmission power levels than each other, including (i) a first pilot signal at a first transmission power level, for receipt and evaluation by a first proper subset of the UEs but not for receipt and evaluation by a second proper subset of the UEs, and (ii) a second pilot signal at a second transmission power level higher than the first transmission power level, for receipt and evaluation by the second proper subset of the UEs but not for receipt and evaluation by the first proper subset of the UEs.

Further, the antenna structure receives from each UE of the first proper subset a respective first measurement report indicating signal strength of the first pilot signal broadcast by the antenna structure but not indicating signal strength of the second pilot signal broadcast by the antenna structure, and the antenna structure receives from each UE of the second proper subset a respective second measurement report indicating signal strength of the second pilot signal broadcast by the antenna structure but not indicating signal strength of the first pilot signal broadcast by the antenna structure.

In addition, the antenna structure may be set to beamform bearer traffic transmissions to particular UEs but not to other UEs. For instance, the antenna structure may be set to beamform bearer traffic transmissions to each UE of the second proper subset but not to each UE of the first proper subset. UEs to which the base station is not beamforming bearer traffic transmissions may thus receive and evaluate the first pilot signal transmitted at the first transmission power level, whereas UEs to which the base station is beamforming bearer traffic transmissions may receive and evaluate the second pilot signal transmitted at the increased transmission power level.

Figure 5:
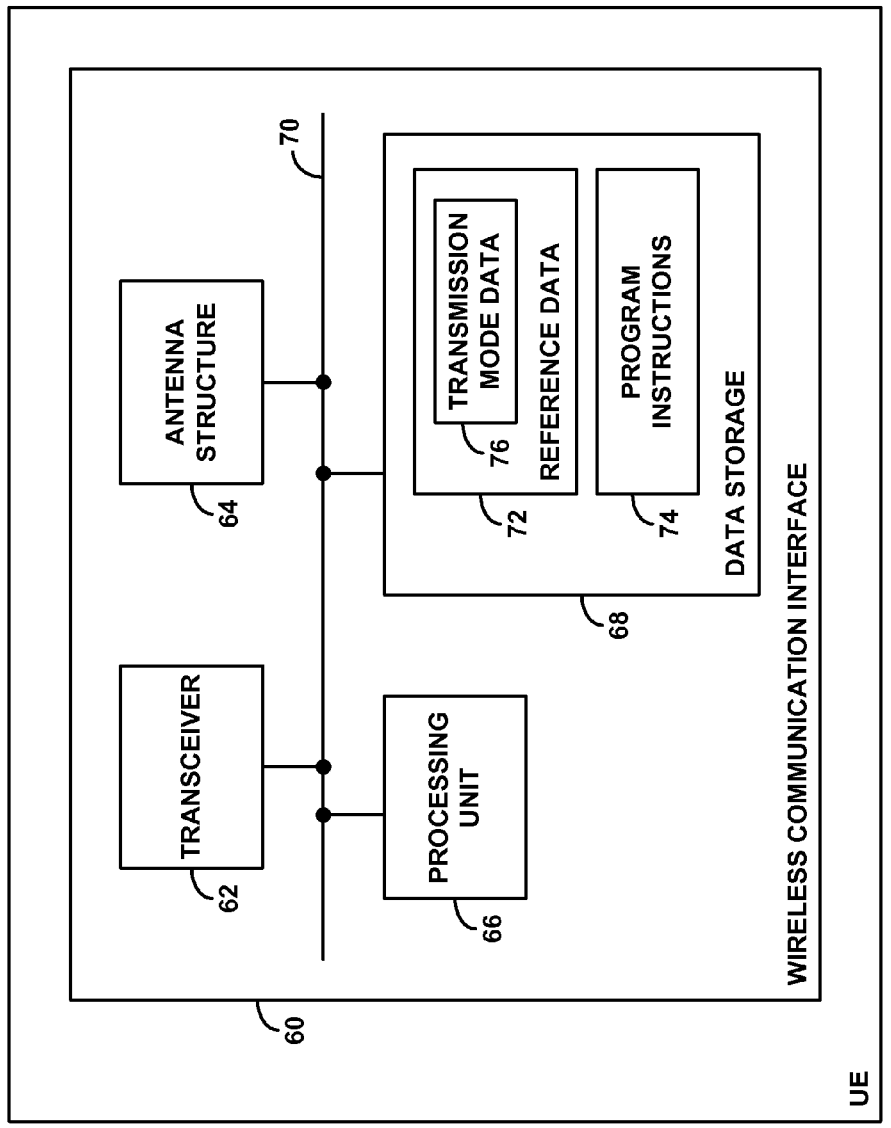
FIG. 5 is a block diagram of an example UE operable in accordance with the disclosure.

Finally, FIG. 5 is a simplified block diagram of an example UE operable in accordance with the present disclosure. The UE may be any of a variety of devices, whether or not technically operated by a "user." For example, the UE may be a cell phone, a tablet computer, a tracking device, an embedded wireless module, or any other wirelessly equipped communication device.

As shown in FIG. 5, the example UE includes a wireless communication interface 60, which is shown including a transceiver 62, an antenna structure 64, a processing unit 66, and data storage 68, some or all of which may be coupled together by a system bus, network, or other connection mechanism 70. In practice, the wireless communication interface 60 may include a chipset integrated with other UE components, such as user interface components or the like, all of which may be contained within a UE housing.

Processing unit 66 may comprise one or more general purpose processors (e.g., microprocessors) and/or one or more special purpose processors (e.g., application specific integrated circuits). And as shown, data storage 68 may hold reference data 72 and program instructions 74. As further shown, reference data may hold transmission mode data 76, which may specify a downlink transmission mode of the UE, such as an indication of whether or not the base station serving the UE will be beamforming bearer transmissions to the UE. Program instructions 74 may then comprise instructions executable by processing unit 66 to control or carry out various UE functions described herein, such as to select one of multiple pilot signals broadcast concurrently on the air interface, to evaluate strength of the selected pilot signal, and to report the evaluated strength to a serving base station.

Exemplary embodiments have been described above. It should be understood, however, that variations from these embodiments are possible, while remaining within the true spirit and scope of the invention. For instance, while the above description focuses on an implementation where each UE receives and evaluates just one pilot signal and not another, an alternative implementation could involve a UE receiving and evaluating more than one pilot signal, but the base station basing handover and other control on just the UE's report regarding a particular such pilot signal, selected in a manner similar to that described above. Other variations are possible as well.

We claim:

1. A method comprising:
   serving, by a base station, a plurality of user equipment devices (UEs) over an air interface;
   while serving the plurality of UEs, wirelessly broadcasting, by the base station, at least two distinct pilot signals concurrently with each other but at different transmission power levels than each other, including (i) a first pilot signal at a first transmission power level, for receipt and evaluation by a first proper subset of the UEs served by the base station but not for receipt and evaluation by a second proper subset of the UEs served by the base station, and (ii) a second pilot signal at a second transmission power level higher than the first transmission power level, for receipt and evaluation by the second proper subset of the UEs served by the base station but not for receipt and evaluation by the first proper subset of UEs served by the base station, wherein the first and second proper subsets are defined based on whether the base station beamforms downlink transmission of bearer traffic, wherein the base station beamforms downlink transmission of bearer data to each UE of the second proper subset but the base station does not beamform downlink transmission of bearer data to each UE of the first proper subset;
   receiving, by the base station, from each UE of the first proper subset a respective first measurement report that indicates signal strength of the first pilot signal but that does not indicate signal strength of the second pilot signal; and
   receiving, by the base station, from each UE of the second proper subset a respective second measurement report that indicates signal strength of the second pilot signal but that does not indicate signal strength of the first pilot signal.

2. The method of claim 1, wherein broadcasting the first and second pilot signals concurrently but at different transmission power levels comprises interleaving the first and second pilot signals over time.

3. The method of claim 2, wherein interleaving the first and second pilot signals over time comprises alternating on a per subframe basis between transmitting the first pilot signal and transmitting the second pilot signal.

4. The method of claim 1, wherein broadcasting the first and second pilot signals concurrently comprises broadcasting the first and second pilot signals on respective downlink pilot channels concurrently.

5. The method of claim 1, wherein beamforming downlink transmission of bearer traffic occurs on a physical downlink shared channel.

6. The method of claim 1, further comprising:
   for each UE in the first proper subset, using by the base station the first measurement report from the UE as a basis to control handover of the UE; and
   for each UE in the second proper subset, using by the base station the second measurement report from the UE as a basis to control handover of the UE.

7. The method of claim 1, wherein the air interface is a Long Term Evolution (LTE) air interface.

8. A method comprising:
   receiving, by a user equipment device (UE) served by a base station, at least two pilot signals wirelessly broadcast from the base station concurrently with each other but at different transmission power levels than each other;
   selecting, by the UE, just one of the at least two received pilot signals to evaluate and use as a basis to report pilot signal strength to the base station, wherein the UE is set to operate in a downlink transmission mode that is either beamforming or non-beamforming, and wherein selecting just one of the at least two received pilot signals to evaluate and use as a basis to report receive signal strength to the base station comprises performing the selecting based on whether the downlink transmission mode in which the UE is set to operate is beamforming or is rather non-beamforming;
   evaluating by the UE the selected received pilot signal to determine pilot signal strength; and
   reporting from the UE to the base station the determined pilot signal strength.

9. The method of claim 8, wherein the at least two pilot signals broadcast at different transmission power levels than each other are interleaved over time, and wherein receiving the at least two pilot signals broadcast concurrently with each other comprises receiving the at least two pilot signals interleaved over time.

10. The method of claim 9, wherein the at least two pilot signals includes at least a first pilot signal broadcast at a first transmission power level and a second pilot signal broadcast at a second transmission power level higher than the first transmission power level.

11. The method of claim 10, wherein the first and second pilot signals are interleaved over time by alternating on a per subframe basis between transmission of the first pilot signal and the second pilot signal.

12. The method of claim 8, wherein each of the at least two pilot signals is broadcast on a separate pilot channel, and wherein receiving the at least two pilot signals broadcast concurrently with each other comprises receiving one of the at least two pilot signals on a first pilot channel while receiving another of the at least two pilot signals on a second pilot channel.

13. The method of claim 8, further comprising:
   receiving into the UE from the base station a directive for the UE to operate in the downlink transmission mode that is either beamforming or non-beamforming, and the UE responding to the directive by (i) operating in the downlink transmission mode and (ii) performing the selecting.

14. The method of claim 8,
   wherein the at least two pilot signals includes at least a first pilot signal broadcast at a first transmission power level and a second pilot signal broadcast at a second transmission power level higher than the first transmission power level, and
   wherein selecting just one of the at least two received pilot signals to evaluate and use as a basis to report receive pilot signal strength to the base station comprises (i) selecting the first pilot signal if the downlink transmission mode in which the UE is set to operate is non-beamforming, but (ii) selecting the second pilot signal instead if the downlink transmission mode in which the UE is set to operate is beamforming.

15. The method of claim 14, wherein the downlink transmission mode is for transmission to the UE of bearer traffic on a physical downlink shared channel.

16. A base station operable to serve a plurality of user equipment devices (UEs), the base station comprising:
- an antenna structure arranged to exchange communications with the UEs over an air interface,
- wherein while the base station is serving the plurality of UEs, the antenna structure broadcasts on the air interface at least two distinct pilot signals concurrently with each other but at different transmission power levels than each other, including (i) a first pilot signal at a first transmission power level, for receipt and evaluation by a first proper subset of the UEs but not for receipt and evaluation by a second proper subset of the UEs, and (ii) a second pilot signal at a second transmission power level higher than the first transmission power level, for receipt and evaluation by the second proper subset of the UEs but not for receipt and evaluation by the first proper subset of the UEs, wherein the first and second proper subsets are defined based on whether the base station beamforms downlink transmission of bearer traffic, wherein the base station beamforms downlink transmission of bearer data to each UE of the second proper subset but the base station does not beamform downlink transmission of bearer data to each UE of the first proper subset
- wherein the antenna structure receives, from each UE of the first proper subset a respective first measurement report indicating signal strength of the first pilot signal broadcast by the antenna structure but not indicating signal strength of the second pilot signal broadcast by the antenna structure, and
- wherein the antenna structure receives, from each UE of the second proper subset a respective second measurement report indicating signal strength of the second pilot signal broadcast by the antenna structure but not indicating signal strength of the first pilot signal broadcast by the antenna structure.

17. The base station of claim 16, wherein broadcasting the at least two distinct pilot signals concurrently with each other but at different transmission power levels than each other comprises interleaving the at least two distinct pilot signals over time.

* * * * *